United States Patent
Montgomery et al.

(10) Patent No.: US 7,447,395 B2
(45) Date of Patent: Nov. 4, 2008

(54) SILICON MODULATOR OFFSET TUNING ARRANGEMENT

(75) Inventors: Robert Keith Montgomery, Easton, PA (US); Margaret Ghiron, Allentown, PA (US); Prakash Gothoskar, Allentown, PA (US); Paulius Mindaugas Mosinskis, Richlandtown, PA (US); Vipulkumar Patel, Breinigsville, PA (US); Kalpendu Shastri, Orefield, PA (US); Mark Webster, Bethlehem, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 11/810,591

(22) Filed: Jun. 6, 2007

(65) Prior Publication Data

US 2007/0292075 A1 Dec. 20, 2007

Related U.S. Application Data

(60) Provisional application No. 60/928,386, filed on May 9, 2007, provisional application No. 60/813,913, filed on Jun. 15, 2006.

(51) Int. Cl.
*G02B 6/12* (2006.01)
*G02F 1/295* (2006.01)
(52) U.S. Cl. .................. 385/14; 385/2; 385/8; 385/9; 385/40
(58) Field of Classification Search ............. 385/1, 385/2, 4, 8, 9, 14, 40
See application file for complete search history.

(56) References Cited

U.S. PATENT DOCUMENTS

| 4,359,773 | A | 11/1982 | Swartz et al. |
|---|---|---|---|
| 5,025,456 | A | 6/1991 | Ota et al. |
| 5,027,362 | A | 6/1991 | Hokanson et al. |
| 5,191,462 | A | 3/1993 | Gitlin et al. |
| 5,430,766 | A | 7/1995 | Ota et al. |
| 5,539,730 | A | 7/1996 | Dent |
| 6,278,822 | B1 * | 8/2001 | Dawnay ............... 385/50 |
| 6,393,185 | B1 * | 5/2002 | Deacon ............... 385/50 |
| 6,600,848 | B2 * | 7/2003 | Paris ................... 385/16 |
| 6,646,747 | B2 | 11/2003 | Deliwala |
| 6,654,511 | B2 | 11/2003 | Deliwala |
| 6,753,992 | B2 | 6/2004 | Steier et al. |
| 6,778,313 | B2 | 8/2004 | Kambe |
| 6,849,914 | B2 * | 2/2005 | Day ..................... 257/431 |
| 6,912,079 | B2 | 6/2005 | Liu |
| 7,023,534 | B2 | 4/2006 | Lee et al. |
| 7,127,129 | B2 | 10/2006 | Liu |

(Continued)

*Primary Examiner*—Sung Pak
*Assistant Examiner*—Daniel Petkovsek
(74) *Attorney, Agent, or Firm*—Wendy W. Koba (57) ABSTRACT

A silicon-based optical modulator structure includes one or more separate localized heating elements for changing the refractive index of an associated portion of the structure and thereby providing corrective adjustments to address unwanted variations in device performance. Heating is provided by thermo-optic devices such as, for example, silicon-based resistors, silicide resistors, forward-biased PN junctions, and the like, where any of these structures may easily be incorporated with a silicon-based optical modulator. The application of a DC voltage to any of these structures will generate heat, which then transfers into the waveguiding area. The increase in local temperature of the waveguiding area will, in turn, increase the refractive index of the waveguiding in the area. Control of the applied DC voltage results in controlling the refractive index.

19 Claims, 5 Drawing Sheets

U.S. PATENT DOCUMENTS

| | | |
|---|---|---|
| 7,136,544 B1 | 11/2006 | Gunn, III et al. |
| 7,164,821 B2 | 1/2007 | Gunn, III |
| 7,184,613 B2 | 2/2007 | Samara-Rubio et al. |
| 7,187,837 B2 * | 3/2007 | Gothoskar et al. .......... 385/131 |
| 7,203,403 B2 | 4/2007 | Gunn, III |
| 2005/0175281 A1 * | 8/2005 | Thapliya et al. ............... 385/28 |

* cited by examiner

SILICON MODULATOR OFFSET TUNING ARRANGEMENT

CROSS-REFERENCE TO RELATED APPLICATION

This application claims the benefit of U.S. Provisional Application No. 60/813,913, filed Jun. 15, 2006, and U.S. Provisional Application No. 60/928,386, filed May 9, 2007.

TECHNICAL FIELD

The present invention relates to an arrangement for providing independent control of modulation characteristics (phase and amplitude) and offset (bias) in an SOI-based optical modulator utilizing thermo-optic adjustment techniques.

BACKGROUND OF THE INVENTION

For many years, external optical modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear (digital) Mach-Zehnder modulator is formed. In particular, the optical signal is launched into the waveguide, and the electrical signal input is applied to the contacts (using proper voltage levels, as mentioned above). The optical signal is phase modulated as it propagates along the arms to generate the output optical signal. A similar result is possible with a linear (analog) optical output signal.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform.

Figure 1:
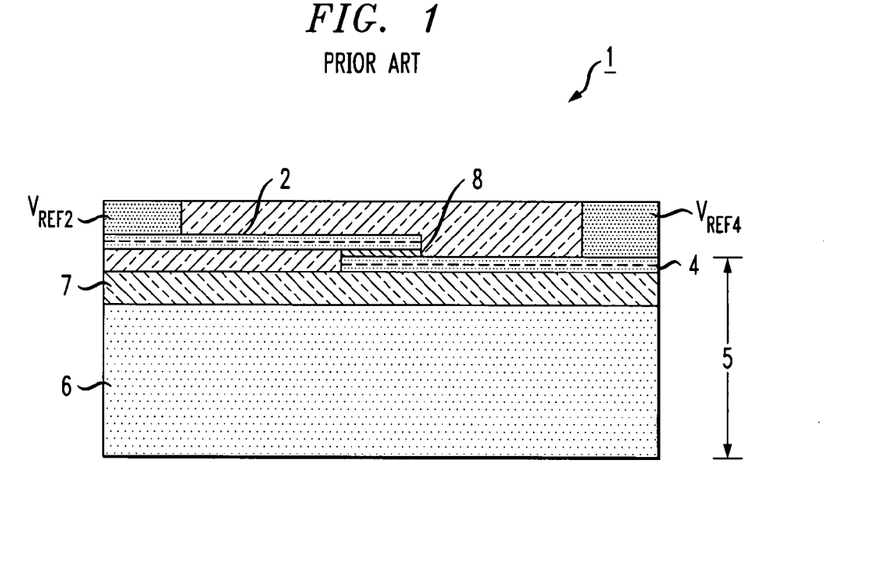
FIG. 1 is a side view of an exemplary prior art SOI-based optical modulator comprising an overlapped structure active region.

A significant advance in the ability to provide optical modulation in a silicon-based platform has been made, as disclosed in U.S. Pat. No. 6,845,198 issued to R. K. Montgomery et al. on Jan. 18, 2005 and assigned to the assignee of this application. FIG. 1 illustrates one exemplary arrangement of a silicon-based modulator device as disclosed in (for example) the Montgomery et al. patent. In this case, SOI-based optical modulator 1 comprises a doped silicon layer 2 (typically, polysilicon) disposed in an overlapped arrangement with an oppositely-doped portion of a sub-micron thick silicon surface layer 4 (often referred to in the art as an SOI layer). SOI layer 4 is shown as the surface layer of a conventional SOI structure 5, which further includes a silicon substrate 6 and buried oxide layer 7. Importantly, a relatively thin dielectric layer 8 (such as, for example, silicon dioxide, silicon nitride or the like) is disposed along the overlapped region between SOI layer 4 and doped silicon layer 2. The overlapped area defined by silicon layer 2, dielectric 8 and SOI layer 4 defines the 'active region' of optical modulator 1. Free carriers will accumulate and deplete on either side of dielectric 8 as a function of the voltages applied to SOI layer 4 ($V_{REF4}$) and/or doped silicon layer 2 ($V_{REF2}$). The modulation of the free carrier concentration results in changing the effective refractive index in the active region, thus introducing phase modulation of an optical signal propagating along a waveguide defined by the action region (the optical signal propagating along the y-axis, in the direction perpendicular to the paper).

A remaining area of concern for optical modulators of the type developed by Montgomery et al. is associated with the ability to modify/tune the modulation in order to adjust/correct for process variations, changes in ambient conditions (such as temperature), device aging, and the like.

SUMMARY OF THE INVENTION

The need remaining in the prior art is addressed by the present invention, which relates to an arrangement for providing independent control of modulation characteristics (phase and amplitude) and offset (bias) in an SOI-based optical modulator by providing thermal adjustments to the optical characteristics of the device.

In accordance with the present invention, free carrier movement is used to realize the phase and absorption compensating requirements of an SOI-based optical modulator, in a manner similar to that of the prior art. Additionally, the thermo-optic effect is used to realize an opposite sign phase shift effect. Localized heating within the optical waveguiding region is utilized, in accordance with the present invention, to adjust the response of the modulating area.

It is an aspect of the present invention that localized heating may be integrated with the previously-utilized SISCAP modulator structure (or any other suitable silicon-based optoelectronic modulating device) in a manner that provides for relative ease in fabrication, as well as relatively compact device geometries. Heating may be provided by, for example, silicon-based resistors, silicide resistors, forward-biased PN junctions, and the like, where any of these structures may easily be incorporated with a SISCAP optical modulator such as that taught by Montgomery et al. The application of a DC voltage to any of these structures will result in increasing the local temperature of the waveguiding area, where the phrase "DC voltage" is defined as including signals that are substantially DC in nature. The heating may be applied along a single, continuous area or, alternatively, applied along separate segments of the waveguiding area.

In one embodiment of the present invention the free carrier modulation and thermal tuning are accomplished along physically disparate portions of the waveguide to reduce the potential for electrical interaction between the AC modulation signal and the DC heating signal. In an alternative embodiment, a savings in the necessary physical length of the waveguide is obtained by incorporating electrically isolating material between adjacent thermal and modulating elements.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 2:
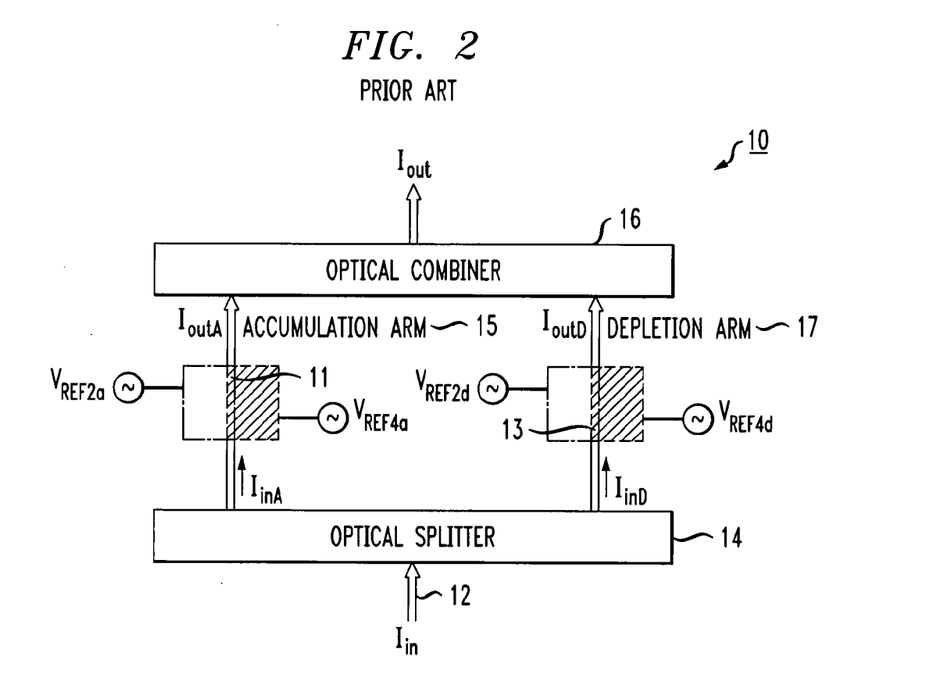
FIG. 2 is a prior art diagram of an SOI-based interferometer.

Prior to describing the utilization of both free carrier modulation and thermal offset control for an SOI-based optical modulator, it is considered helpful to provide an understanding of the operation of a prior art modulator in greater detail. FIG. 2 is a simplified block diagram of an exemplary prior art Mach Zehnder interferometer 10 showing the individual arms of the design, denoted as accumulation arm 15 and depletion arm 17, where interferometer 10 is based upon the prior art structure discussed above in association with FIG. 1. Each arm of interferometer 10 contains a free-carrier-based phase modulator device, controlled by AC modulating signals applied SOI layer 4 and doped silicon layer 2 in the manner described above. The signals applied to each arm operate independent, shown in FIG. 2 as signals $V_{REF2a}$ and $V_{REF4a}$ used to control accumulation arm 15, and signals $V_{REF2d}$ and $V_{REF4d}$ used to control modulation within depletion arm 17. In one embodiment, SOI layer 4 may be fabricated to include p-type dopants, where doped silicon layer 2 then necessarily includes n-type dopants. Preferably, the doping profile is controlled such that the dopant concentration in the active region is less than that in the area of contact to the $V_{REF}$ areas, where the $V_{REF}$ contact areas may comprise silicide regions.

In operation, an optical signal $I_{in}$ is illustrated as traveling along an input waveguide 12 (preferably formed within SOI layer 4) and enters an optical splitter 14 (also preferably formed within SOI layer 4). Optical splitter 14 may simply divide in half the optical power present in signal, such that a balanced 50/50 split in power is presented to each arm 15, 17 of modulator 10 (however, any other desired power split may be used). A first output from optical splitter 14, denoted $I_{inA}$, is thereafter applied as the optical input signal to accumulation arm 15 of modulator 10. Similarly, a second output from optical splitter 14, denoted $I_{inD}$, is applied as the input signal to depletion arm 17. Subsequent to being modulated by the values of $V_{REF2a}$, $V_{REF4a}$ and $V_{REF2d}$, $V_{REF4d}$ controlling the active regions 11 and 13 of each arm, respectively, the modulated output signals are combined in an optical combiner 16 to form the modulated optical output signal ($I_{OUT}$).

As mentioned above, there exist fabrication and environmental factors that may affect the performance of such an SOI-based electro-optic modulator. Due to process variations in standard silicon integrated circuit fabrication techniques, there exists a need to compensate for variations in each arm of the interferometer. These variations can be attributed to a number of different sources, such as variations in waveguide width, thickness, and spacing between adjacent waveguides, as well as material defects and refractive index variations. Moreover, it is possible that etched features may alter mode propagation characteristics, resulting in deviations in the optimal power splitting. Amplitude variations can occur as a result of scattering and variation in radiation losses. Indeed, there may be differences in the phase shift and absorption properties within each arm, as a result of waveguide sidewall roughness/thickness variations. The operation of the modulator may also be effected by environmental factors such as ambient temperature, humidity, device aging and the like. The arrangement of the present invention is proposed to address these concerns by applying independent free carrier modulation and thermal tuning control to overcome variations that may exist (as well as provide an on-going means to adjust the modulator's operation over the life of the device).

Figure 3:
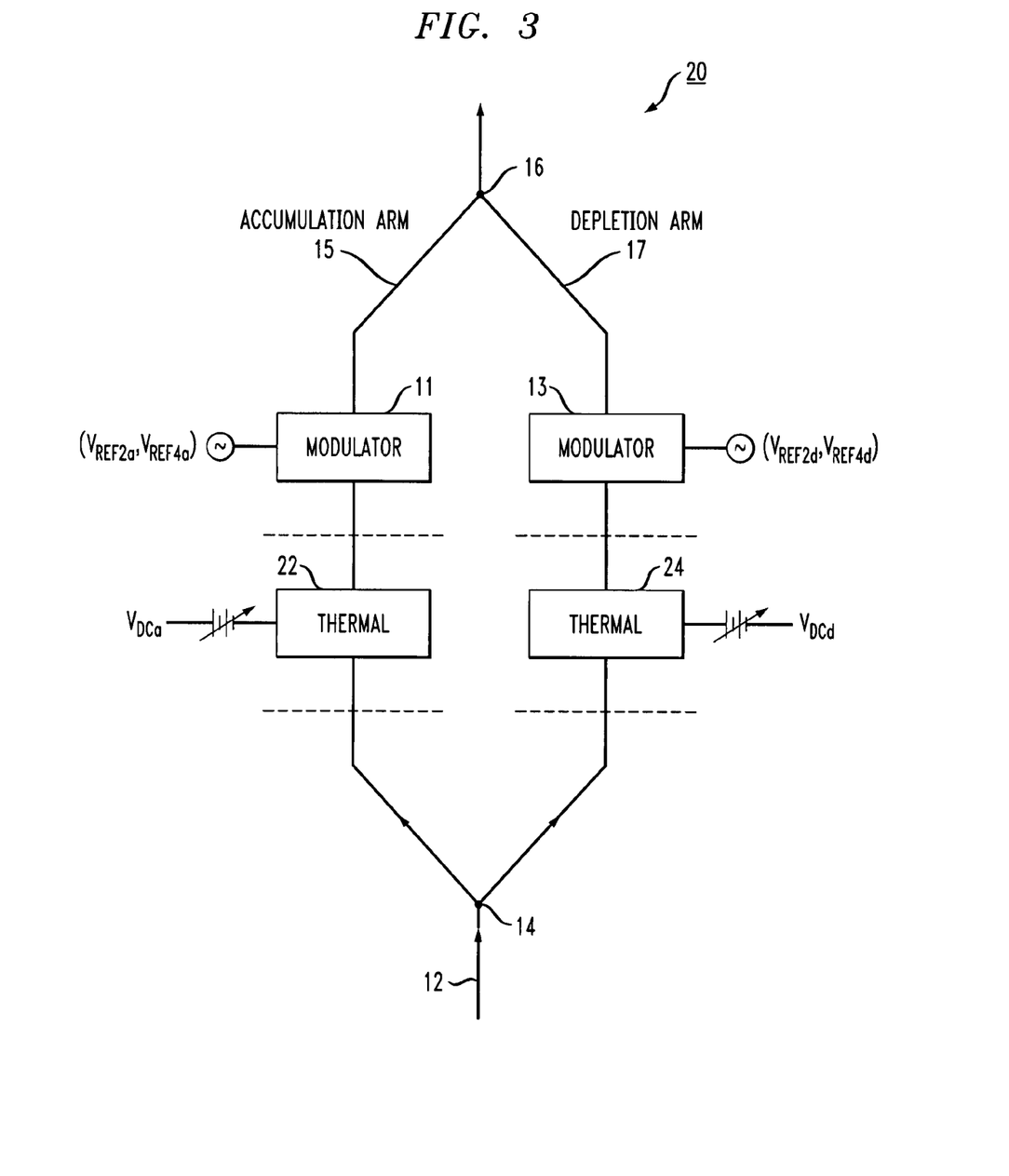
FIG. 3 is a simplified diagram of an exemplary SOI-based modulator formed in accordance with the present invention to include both modulating sections and thermal tuning sections along each waveguiding arm of the modulator.

FIG. 3 contains a simplified diagram of an exemplary SOI-based electro-optic modulator 20, formed in accordance with the present invention to provide independent thermal tuning to compensate for unwanted amplitude and phase offsets in accordance with the present invention. In the specific embodiment illustrated in FIG. 3, thermal elements 22 and 24 are disposed along accumulation arm 15 and depletion arm 17, respectively, to provide independent thermal adjustment/tuning of the optical properties of the modulator. Inasmuch as the thermo-optic effect of silicon is realized by an increase in refractive index as a function of temperature ($dn/dT=1.86 \times 10^{-4}/°K$.), induced temperature changes along one or both arms of the modulator may be used to offset unwanted variations by controlling the bias point of the modulator. In the particular embodiment as illustrated in FIG. 3, thermal elements 22 and 24 are disposed along the waveguide arms so as to be physically separated from the modulator areas (denoted by active regions 11 and 13). While thermal elements 22 and 24 are shown as single units, segmented heating may be applied by separate thermal elements along the waveguiding area.

As mentioned above, thermal elements 22 and 24 may comprise heat generators of two different types: resistive elements (such as, for example silicon-based resistors or silicide-based resistors) or PN junction elements (such as a forward-biased PN junctions). In either case, the elements are controlled by the application of a DC voltage to generate heating which propagates through the structure and enters the waveguiding area of the device, where the magnitude of the applied voltage is directly proportional to the increase in temperature experienced by the material (the term "DC" as used herein is defined as including "substantially DC" signals, including extremely low frequency signals). The value of the DC voltages applied to thermal elements 22, 24 are controlled independently of one another, designated in FIG. 3 as voltage $V_{DCa}$ applied to accumulation arm thermal element 22 and voltage $V_{DCd}$ applied to depletion arm thermal element 24. The change in temperature within the waveguiding region will change the effective refractive index and as a result adjust the phase shift experienced by the optical signal passing therethrough. It is to be understood that the separate voltages $V_{DCa}$ and $V_{DCd}$ applied to thermal elements 22 and 24 may be modified, at will, to adjust to changing operating conditions of the modulating device. Moreover, although not shown in the drawings, it is to be understood that the output signal from modulator 20 (or any other appropriate optical signal) may be monitored within a feedback loop that is used to adjust the magnitude of voltage applied to element 22 and/or element 24.

Figure 4:
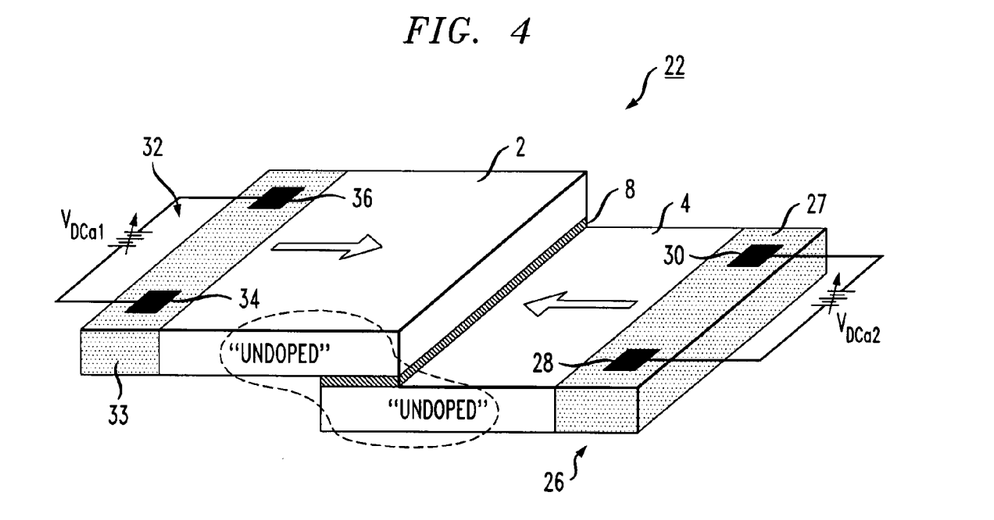
FIG. 4 is a cut-away isometric view of one exemplary resistive-based thermal element for use in the arrangement of FIG. 3.

FIG. 4 is a cut-away isometric view of an exemplary thermal element 22, illustrating in this particular embodiment an arrangement that is utilized to provide heating via the formation of SISCAP thermal elements. The arrangement as shown in FIG. 4 comprises a pair of SISCAP thermal elements, including a first SISCAP thermal element 26 integrated within SOI layer 4, as defined above. In order to minimize unwanted free carrier interactions within the waveguiding portion of this structure (as shown by the dotted line in FIG. 4), polysilicon layer 2 and SOI layer 4 are preferably undoped (or lightly doped) within the central region. The structure as shown in FIG. 4 therefore has labeled the waveguiding portions of both polysilicon layer 2 and SOI layer 4 as being "undoped", where this definition is intended to include lightly doped.

Referring again to FIG. 4, first SISCAP thermal element 26 is shown as comprising a doped section 27 of SOI layer 4 (removed from the waveguiding region). Doped section 27 further comprises a pair of contact regions 28 and 30, where the application of a DC voltage ($V_{DCa2}$) between regions 28 and 30 will result in the flow of a current along section 27 and induce thermal changes in SOI layer 4. The direction of thermal transfer from doped section 27 into the waveguiding area is illustrated by the double-lined arrow in FIG. 4.

A separate thermal element 32 may similarly be formed within a spaced-apart doped section 33 of polysilicon layer 4, where thermal element 32 is also illustrated in FIG. 4. Thermal element 32 includes a pair of contacts 34 and 36 disposed as shown along doped section 33. Again, the application of a DC voltage ($V_{DCa1}$) between contacts 34 and 36 will result in the flow of current and localized heating of the device, the heat transfer toward the waveguiding area shown by the double-lined arrow in FIG. 4. In accordance with the teachings of the present invention, either a single thermal element (in this case, either element 26 or element 32) or a pair of thermal elements (both elements 26 and 32) may be used to provide "thermal heating" within the definition of thermal element 22 as shown in FIG. 3. Moreover, the DC voltages applied to the separate thermal elements 26, 32 may be different and separately controlled to provide the desired amount of heating. That is, the applied voltage $V_{DCa1}$ may have a different (adjustable) value than the applied voltage $V_{DCa2}$, where the value of $V_{DCa2}$ is also separately adjustable to provide the desired degree of heating.

The device structure as shown in FIG. 4 may be modified in a manner such that a silicide material is located between contact portions 28, 30 (and/or contacts 34,36) and the underlying silicon material. The use of such a 'silicide resistor' is considered to provide for a broader temperature range as a function of applied voltage. The use of silicon or silicide as the resistive-based heat generating element is considered to be a design choice. Further, this resistive-type of thermal heating element may be used with any of the known or developed SOI-based electro-optic modulator structures, including but not limited to the SISCAP structure, the lateral PN junction structure, ribbed waveguide structure, etc., or other modulator structures including, but not limited to, ring resonator modulators and electro-absorption modulators. Indeed, it is the inherent properties of the silicon material and the well-known CMOS processing techniques that are advantageously employed in the present invention to provide various types of thermal modifications to the SOI-based modulator design.

Figure 5:
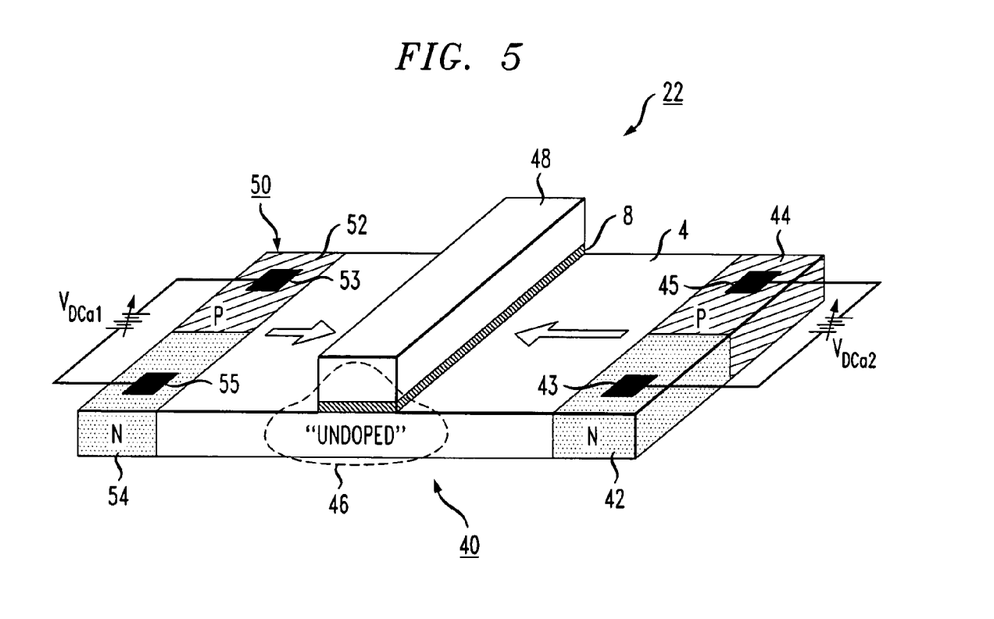
FIG. 5 is a cut-away isometric view of an exemplary PN-junction based thermal element for use in the arrangement of FIG. 3.

FIG. 5 is a cross-sectional view of an alternative exemplary thermal element 22, in this case a forward-biased PN junction thermal device 40 disposed along a first side of the waveguiding arm (either the accumulation arm or depletion arm, as the case may be). Device 40 may be formed within a portion of SOI layer 4, with a first region 42 being N-doped and a second, contiguous region 44 being P-doped. Waveguiding within thermal element 22 is accomplished along a central, essentially undoped portion 46 of the device structure, in this case comprising a rib waveguide 48 separated from SOI layer 4 (in this particular embodiment) by gate dielectric 8. Gate dielectric 8, as noted above, is a relatively thin layer (on the order of 100A or less) and comprises a material such as silicon dioxide or silicon nitride. Rib waveguide 48 may comprise, for example, polysilicon or a doped polysilicon material.

In accordance with the present invention, the PN junction created by regions 42, 44 is located at a predetermined distance from this central, undoped portion 46 in order to prevent unwanted free carrier movement from affecting the propagating optical signal. In order to provide heat generation, a DC voltage $V_{DCa2}$ is applied between P contact 45 and N contact 43, forming a forward-biased PN junction. The generated heat is then directed toward the central waveguiding portion 46, as shown by the double-lined arrows in FIG. 5.

Similar to the resistive arrangements discussed above in association with FIG. 4, a second PN-junction thermal element 50 may be formed on the opposing side of central portion 46 of the arrangement of FIG. 5. PN-junction thermal element 50 includes a P-doped region 52 and a contiguous N-doped region 54 (again, regions 52 and 54 are located at a predetermined distance away from central portion 46). A DC voltage $V_{DCa1}$ is then applied between P contact 53 and N contact 55, creating thermal energy that is directed toward central portion 46.

In the embodiment of the present invention as shown in FIG. 3, thermal elements 22 and 24 are disposed in series with the actual modulating portion of the arrangement along arms 15 and 17 (denoted by active regions 11 and 13), with a sufficient spacing therebetween to prevent the operation of the thermal portion from affecting the modulation, and allowing for separate and independent control of each aspect of the modulator. Clearly, such arrangements require the use of extended waveguide lengths for the modulator. In certain cases, particularly high speed arrangements, it would be preferable to maintain the waveguide length to the minimum required to generate modulation through free carrier movement.

Figure 6:
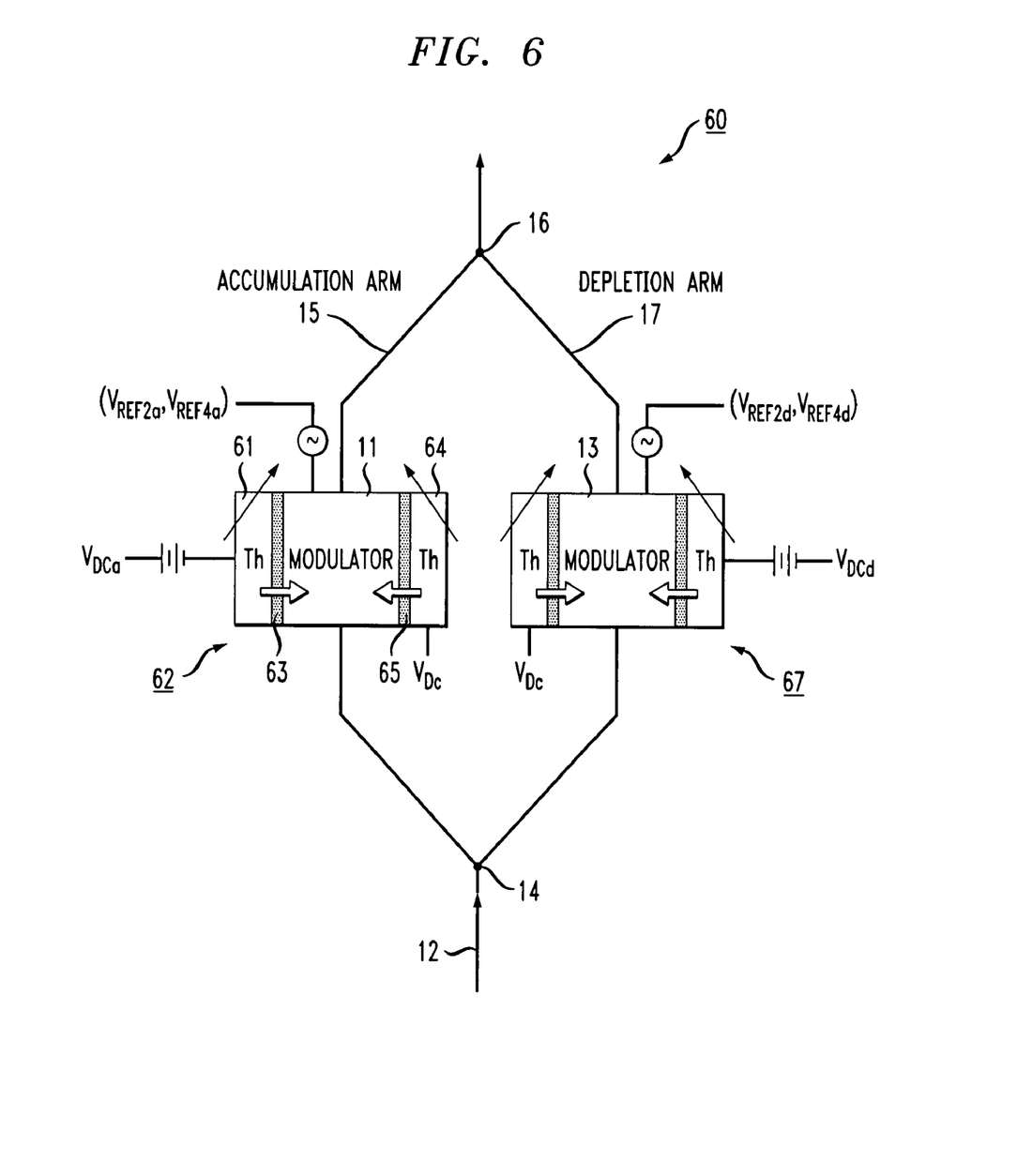
FIG. 6 is a simplified diagram of an alternative modulator configuration of the present invention where the thermal tuning sections are disposed along the same waveguide areas as the modulation sections.

An alternative embodiment of the present invention that addresses this concern is shown in simplified block diagram form in FIG. 6, which is a diagram of an exemplary electro-optic modulator 60 that utilizes a pair of thermal elements 62 and 67 disposed adjacent to active regions 11 and 13, respectively. As a result, this embodiment of the present invention provides for a significant reduction in the overall length of the modulator device, while still providing thermal adjustments to the free carrier modulation (compare FIG. 3 to FIG. 6). In order to prevent the application of the DC voltages $V_{DCa}$ and $V_{DCd}$ to elements 62 and 67 (respectively) from interfering with the free carrier modulation provided by an AC signals applied to active regions 11 and 13, additional physical or electrical isolation (in terms of oxide/dielectric/undoped regions) are included within modulator arms 15 and 17, as described below.

As with the various heat generating arrangements discussed above, thermal elements 62, 67 may comprise either resistive-based heat generating elements (e.g., silicon resistors, silicide resistors), or PN-junction based heat generating elements. Additionally, the heat generation may be applied to both sides of the waveguide arms (as shown in FIG. 6), or merely along one side of each arm (or only one arm) of the modulator structure.

Figure 7:
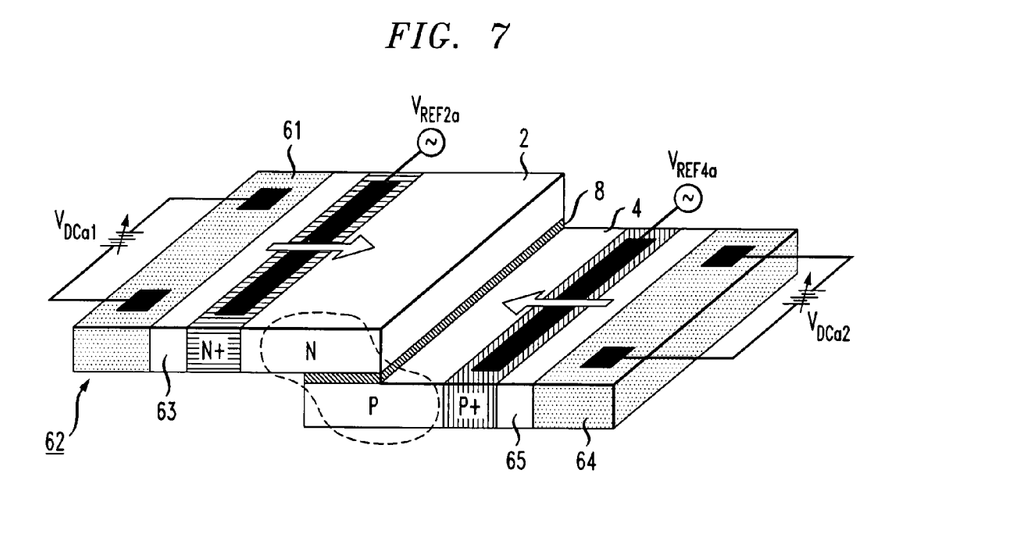
FIG. 7 is a cut-away view of an exemplary thermal tuning section and associated modulating section for use in the arrangement of FIG. 6.

FIG. 7 illustrates one exemplary arrangement for providing modulation and thermal adjustment within the structure as outlined in FIG. 6 as applied (for example) to accumulation arm 15. In this case, thermal element 62 comprises a first portion 61 disposed beyond the electrical connection to $V_{REF2a}$ along polysilicon layer 2. A second portion 64 is disposed beyond the electrical connection to $V_{REF4a}$ along SOI layer 4. The application of a DC bias voltages $V_{DCa1}$ and $V_{DCa2}$ to portions 61 and 64, respectively, will generate heating in the direction of the waveguiding region, as shown by the double-lined arrows in FIG. 7. A similar structure may be used to form thermal element 67 disposed along depletion arm 13 (see FIG. 6). It is to be noted elements 62 and 67 may be resistive thermal elements or PN-junction biased thermal elements, as described in detail above. In order to provide electrical isolation between the DC voltages used for thermal heating and the AC voltages used for signal modulation, a pair of essentially undoped regions are formed in SOI layer 4 and polysilicon layer 2 between the contact regions for each voltage source. Referring again to FIG. 7, the isolation associated with thermal element 62 is shown as including a first undoped region 63 formed in polysilicon layer 2 between thermal portion 61 and the contact to $V_{REF2a}$ for the modulating signal. Similarly, a second undoped region 65 is formed in SOI layer 4 between thermal portion 64 and the contact to $V_{REF4a}$.

While the physical separation of thermal portions 61, 64 from contacts associated with $V_{REF2a}$ and $V_{REF4a}$ and the inclusion of undoped regions 63, 65 are useful in minimizing the interaction of the thermal adjustments with the modulation, the need for such a physical separation requires the use of larger surface areas adjacent to each waveguide arm. Thus, while the actual length of the waveguide arms is shortened with respect to the embodiment of FIG. 3, the increase of required "width" for each arm of the device itself may raise other concerns.

Figure 8:
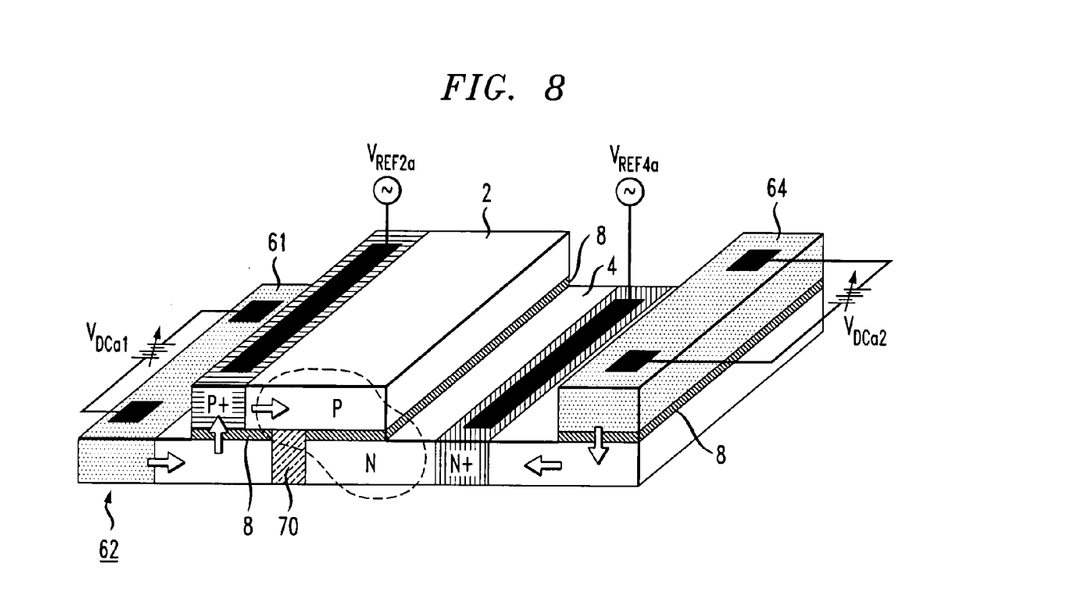
FIG. 8 is a cut-away view of an alternative thermal tuning section and associated modulating section for use in the arrangement of FIG. 6.

FIG. 8 illustrates an alternative embodiment of the arrangement of FIG. 7, where in this particular embodiment electrical isolation between $V_{REF2a}$, $V_{REF4a}$ and $V_{DCa1}$, $V_{DCa2}$ is used to allow for the thermal/DC contacts to be formed in closer physical proximity to the central waveguiding region. As shown, first thermal portion 61 is electrically isolated from $V_{REF2a}$ through the use of an extension of gate dielectric 8 and a section of shallow trench isolation 70. Shallow trench isolation 70 is formed along SOI layer 4 from the termination of the active device region toward the area where the $V_{REF2a}$ contact is formed in overlying polysilicon layer 2. Second thermal portion 64 is electrically isolated from $V_{REF4a}$ through a separate section of gate dielectric 8 and an undoped (lightly doped) portion of SOI layer 4. By virtue of the fact that gate dielectric 8 is extremely thin (e.g., less than 100A), the heat generated by thermal portions 61, 64 is able to efficiently transfer through, while still providing the desired degree of electrical isolation.

It is to be understood that various other modifications may be made to any of the above-described embodiments, and yet fall within the spirit and scope of the present invention. Indeed, the various thermal adjustment arrangements as described hereinabove may also be used with various other active and passive optical devices to provide modifications of the optical properties of the devices as a function of temperature. The scope of this invention, therefore, is considered to be limited only by the claims appended hereto.

What is claimed is:

1. A silicon-based optical modulating device formed in a silicon-on-insulator (SOI)-based structure including a silicon substrate. a buried oxide layer and a sub-micron thick silicon surface layer, the modulating device comprising
   an optical waveguide formed in the sub-micron thick silicon surface layer for supporting the propagation of an incoming lightwave signal;
   a modulating element disposed along the waveguide to introduce an electrical alternating current (AC) modulating signal into the optical waveguide and modify the properties of the propagating lightwave signal, the modulating element comprising a doped silicon layer disposed in an overlapped arrangement with an oppositely-doped portion of the sub-micron thick silicon surface layer; and
   a thermo-optic element disposed along the optical waveguide and responsive to an applied direct current (DC) voltage to generate heat that is transferred into the waveguide so as to modify the waveguide refractive index as a function of the change in temperature.

2. A silicon-based optical modulating device as defined in claim 1 wherein the modulating element and the thermo-optic element are disposed along physically separate portions of the optical waveguide.

3. A silicon-based optical modulating device as defined in claim 1 wherein the modulating element and the thermo-optic element are disposed along substantially the same area of the waveguide, with electrical isolation disposed therebetween.

4. A silicon-based optical modulating device as defined in claim 3 wherein the electrical isolation comprises essentially undoped silicon regions.

5. A silicon-based optical modulating device as defined in claim 3 wherein the electrical isolation comprises a relatively thin dielectric layer disposed between the modulating element and the thermo-optic element.

6. A silicon-based optical modulating device as defined in claim 5 wherein the relatively thin dielectric layer comprises a thickness of less than 100A.

7. A silicon-based optical modulating device as defined in claim 5 wherein the relatively thin dielectric layer comprises silicon dioxide.

8. A silicon-based optical modulating device as defined in claim 5 wherein the relatively thin dielectric layer comprises silicon nitride.

9. A silicon-based optical modulating device as defined in claim 1 wherein the thermo-optic element comprises a resistive-based thermo-optic element.

10. A silicon-based optical modulating device as defined in claim 9 wherein the resistive-based thermo-optic element comprises at least one doped silicon resistor including a pair of spaced-apart contact regions for coupling to an associated DC voltage source.

11. A silicon-based optical modulating device as defined in claim 9 wherein the at least one doped silicon resistor comprises a pair of doped silicon resistors, formed on opposite sides of the waveguiding region and controlled by separate DC voltage sources.

12. A silicon-based optical modulating device as defined in claim 9 wherein the resistive-based thermo-optic element comprises a silicide resistor including a pair of spaced-apart contact regions for coupling to an associated DC voltage source.

13. A silicon-based optical modulating device as defined in claim 1 wherein the thermo-optic element comprises a forward-biased PN junction device.

14. A silicon-based optical modulating device as defined in claim 1 wherein the device comprises an interferometer including an accumulating waveguiding arm and a depletion waveguiding arm, with an accumulation modulating element and accumulating thermo-optic element associated with the accumulation arm and a depletion modulating element and depletion thermo-optic element associated with the depletion arm.

15. A silicon-based optical modulating device as defined in claim 14 wherein the electrical AC modulating signal applied to the accumulation waveguiding arm modulation element is independent of the electrical AC modulating signal applied to the depletion waveguiding arm modulation element.

16. A silicon-based optical modulating device as defined in claim 14 wherein the DC voltage applied to the accumulation arm thermo-optic element is independent of the DC voltage applied to the depletion arm thermo-optic element.

17. A silicon-based optical modulating device as defined in claim 1 wherein the modulating device comprises a PN-based opto-electronic modulating device.

18. A silicon-based optical modulating device as defined in claim 1 wherein the modulating device comprises a ring resonator modulating device.

19. A silicon-based optical modulating device as defined in claim 1 wherein the modulating device comprises an electro-absorption modulating device.

* * * * *